United States Patent
Ed et al.

(10) Patent No.: US 11,471,013 B2
(45) Date of Patent: Oct. 18, 2022

(54) INDUSTRIAL AUTOMATED VACUUM CLEANER AND METHOD FOR AUTOMATED SERVICING OF CONSTRUCTION TOOLS

(71) Applicant: HUSQVARNA AB, Huskvarna (SE)

(72) Inventors: Joakim Ed, Gothenburg (SE); Lars Gustafsson, Töreboda (SE); Simon Andersson, Gothenburg (SE); Rajinder Mehra, Johanneshov (SE); Tommy Olsson, Mölndal (SE); Ulf Petersson, Tollered (SE); Richard Bälter, Torslanda (SE)

(73) Assignee: HUSQVARNA AB, Huskvarna (SE)

(*) Notice: Subject to any disclaimer, the term of this patent is extended or adjusted under 35 U.S.C. 154(b) by 0 days.

(21) Appl. No.: 17/326,746

(22) Filed: May 21, 2021

(65) Prior Publication Data

US 2021/0345844 A1 Nov. 11, 2021

Related U.S. Application Data

(63) Continuation of application No. 16/089,155, filed as application No. PCT/SE2017/050241 on Mar. 13, 2017, now Pat. No. 11,089,925.

(30) Foreign Application Priority Data

Mar. 31, 2016 (SE) .................................. 1650422-7

(51) Int. Cl.
*A47L 7/00* (2006.01)
*A47L 9/28* (2006.01)
(Continued)

(52) U.S. Cl.
CPC ............... *A47L 7/0095* (2013.01); *A47L 9/19* (2013.01); *A47L 9/2805* (2013.01);
(Continued)

(58) Field of Classification Search
CPC ........ A47L 7/0095; A47L 9/19; A47L 9/2805; A47L 9/2852; A47L 9/2894; A47L 2201/00; A47L 2201/04; G05D 2201/0215
See application file for complete search history.

(56) References Cited

U.S. PATENT DOCUMENTS

2002/0104184 A1 8/2002 Rogers et al.
2002/0138936 A1 10/2002 Takeuchi et al.
(Continued)

FOREIGN PATENT DOCUMENTS

CN 100424712 C 10/2008
CN 102961085 A 3/2013
(Continued)

OTHER PUBLICATIONS

International Search Report and Written Opinion for International Application No. PCT/SE2017/050241 dated May 16, 2017.

*Primary Examiner* — Natasha N Campbell
(74) *Attorney, Agent, or Firm* — Burr & Forman LLP

(57) ABSTRACT

Industrial vacuum cleaner configured for servicing at least one construction tool, said vacuum cleaner comprising a vacuum inlet, wherein said vacuum cleaner further comprises a controller and connected to said controller a wireless transceiver, a memory, and at least one location and/or orientation sensor configured for detection of vacuum cleaner location and/or localization of other objects in relation to the vacuum cleaner and wherein the vacuum cleaner further comprises means for propulsion controlled by said controller.

13 Claims, 3 Drawing Sheets

(51) Int. Cl.
*G05D 1/02* (2020.01)
*A47L 9/19* (2006.01)

(52) U.S. Cl.
CPC ........... *A47L 9/2852* (2013.01); *A47L 9/2894* (2013.01); *G05D 1/02* (2013.01); *G05D 1/028* (2013.01); *G05D 1/0212* (2013.01); *G05D 1/0225* (2013.01); *A47L 2201/00* (2013.01); *A47L 2201/04* (2013.01); *G05D 2201/0215* (2013.01)

(56) References Cited

U.S. PATENT DOCUMENTS

| | | |
|---|---|---|
| 2010/0199453 A1 | 8/2010 | Brotto et al. |
| 2012/0169497 A1 | 7/2012 | Schnittman et al. |
| 2013/0055521 A1 | 3/2013 | Lee et al. |

FOREIGN PATENT DOCUMENTS

| | | |
|---|---|---|
| CN | 103054515 A | 4/2013 |
| CN | 103324191 A | 9/2013 |
| CN | 103443612 A | 12/2013 |
| CN | 104918528 A | 9/2015 |
| CN | 105030151 A | 11/2015 |
| DE | 102007000280 A1 | 11/2008 |
| EP | 1712970 A2 | 10/2006 |
| JP | 2015058131 A | 3/2015 |
| WO | 2015060672 A1 | 4/2015 |
| WO | 2015072624 A1 | 5/2015 |

INDUSTRIAL AUTOMATED VACUUM CLEANER AND METHOD FOR AUTOMATED SERVICING OF CONSTRUCTION TOOLS

CROSS-REFERENCE TO RELATED APPLICATIONS

This application is a continuation of U.S. patent application Ser. No. 16/089,155 filed on Sep. 27, 2018, now issued as U.S. Pat. No. 11,089,925, which is the national stage entry of International Application No. PCT/SE2017/050241 filed on Mar. 13, 2017, the entire contents of which are incorporated by reference in their entirety.

TECHNICAL FIELD

The teachings herein relates to industrial vacuum cleaners and more specifically to automated industrial vacuum cleaners configured for automated servicing of construction tools and a method for automated servicing of construction tools.

BACKGROUND

In construction sites or in other industrial work sites, a vacuum cleaner is a commonly used tool to remove debris or other remains of materials and/or dust which is generated by for instance construction tools. Some types of construction tools are configured to be connected to vacuum cleaners to ensure that the dust which is generated is collected at the source. This generally means that the construction tool comprises some type of means for collecting the produced dust and which often leads the dust to a dust ejection arrangement to which a vacuum cleaner tube can be connected. Since a construction site can be large and contain many different types of construction tools which require servicing and since there are often not as many vacuum cleaners as there are tools, it can be time consuming to find a vacuum cleaner that is not already in use. To assign one vacuum cleaner to each tool is costly.

Furthermore, as a vacuum cleaner is filled with dust or debris, production has to be stopped as the vacuum cleaner is emptied.

Not all construction tools are stationary; for instance floor grinders are configured to move over the floor which it is working on to ensure that the surface is evenly grinded. For such applications, the tube connecting the grinder to the vacuum cleaner can end up being in the way of the grinder and an operator is therefore always needed to ensure that this situation does not occur. The operator often also needs to be able to see the construction tool more or less at all times during operation, which could be problematic when the vacuum cleaner ends up being in the way of the operators line of sight to the construction tool. Since it is always desirable to keep operators out of a harmful environment and to reduce the amount of dust which is allowed to be emitted from construction tools, it is desired to find a way to reduce the required amount of operator presence during certain procedures and to facilitate the provision of a vacuum cleaner so that an operator does not have to spend unnecessary time collecting one as soon as a dust generating construction tool is to be used.

SUMMARY

It is an object of the teachings herein to provide a vacuum cleaner, a construction tool, a construction system and a method for automated servicing of construction tools which alleviates some of the problems with prior art. This object is achieved by a concept having the features set forth in the appended independent claims; preferred embodiments thereof being defined in the related dependent claims.

According to a first aspect, an automated vacuum cleaner is provided. The vacuum cleaner is configured for servicing at least one construction tool, wherein the vacuum cleaner comprises a vacuum inlet. The vacuum cleaner comprises a controller and connected to said controller a wireless transceiver, a memory, and at least one location and/or orientation sensor configured for detection of vacuum cleaner location and/or localization of other objects in relation to the vacuum cleaner. The vacuum cleaner further comprises means for propulsion controlled by said controller and wherein the automated vacuum cleaner is configured to upon receiving a wireless signal from a construction tool establish the location of said construction tool and to automatically relocate to facilitate servicing of the construction tool. The vacuum cleaner is thereby enabled to wirelessly communicate with construction tools, to locate these at least in relation to the vacuum cleaner position and to automatically move to the construction tool. This means that an operator does not have to spend time looking for a vacuum cleaner nor on collecting one.

In one embodiment the vacuum cleaner further comprises a sensor for detecting level of dust in a dust container of said vacuum cleaner. The vacuum cleaner can thereby determine when to switch of suction and transmit wireless signals indicating full dust reservoir to the construction tool. The vacuum cleaner may also initiate an emptying sequence.

In one embodiment, the vacuum cleaner inlet comprises an end portion configured for connection to a dust ejection arrangement on the construction tool. The vacuum cleaner may thereby automatically physically connect the vacuum inlet to the construction tool.

In one embodiment, the vacuum cleaner vacuum inlet is an extendable tube. The vacuum cleaner further comprises a tube support and a stop which restricts withdrawal of said tube. The tube support ensures that the end portion of the tube is kept in the correct position for connection the construction tool dust ejection arrangement.

In a second aspect of the teachings herein, a construction tool is provided. The construction tool is configured for connection to a vacuum cleaner and comprises a controller and connected to said controller a wireless transmitter and/or a wireless receiver, a memory and at least one location and/or orientation sensor. The construction tool may thereby communicate and request servicing by a vacuum cleaner.

In one embodiment, the construction tool comprises a dust ejection arrangement configured for connection to an end portion of the vacuum inlet of said vacuum cleaner.

In one embodiment the construction tool comprises means for propulsion controlled by said controller.

In a third aspect of the teachings herein a construction system is provided. The system comprising a vacuum cleaner according to the first aspect and a construction tool according to the second aspect. The vacuum cleaner is configured to communicate wirelessly with at least one construction tool and to localize the position and orientation of said construction tool in relation to the vacuum cleaner position and orientation. The system is beneficial in that an operator of a construction tool does not need to look for a vacuum cleaner, as the vacuum cleaner is configured to locate and move to the construction tool upon receiving a servicing request.

In one embodiment, the system further comprises a server configured to wirelessly communicate with the vacuum cleaner and the at least one construction tool. The server, which may be connected to the internet, allows communication over larger distances or when for instance walls are present which obstructs regular RF communication between the vacuum cleaner and the construction tool.

In one embodiment, the system further comprises a construction tool control device wirelessly connected to the construction tool for remote control of said construction tool by an operator, and wherein the vacuum cleaner is configured to ensure that it does not linger in any location that is located in the line of sight between the construction tool control device and the construction tool. This means that the vacuum cleaner avoids moving for extended periods of time in the operator's line of sight to the construction tool, which is beneficial since it improves the operators ability to remote control the construction tool.

According to a fourth aspect of the teachings herein, a method for automated servicing of construction tools is provided. The method comprises; transmitting a wireless signal by the construction tool wherein said wireless signal is a servicing request, receiving of said wireless signal by a vacuum cleaner and determining by the controller in the vacuum cleaner the location and/or orientation of said construction tool in relation to the location and/or orientation of the vacuum cleaner. Whereby the vacuum cleaner is configured to relocate to a location and/or orientation determined by the vacuum cleaner controller. The method removes the time consuming task of trying to find a vacuum cleaner before using a construction tool which also results in that a vacuum cleaner is more often used. This improves the air quality of work sites.

According to one embodiment, the vacuum cleaner is configured to approach the construction tool such that the vacuum inlet is connected to the dust ejection arrangement of the construction tool which transmitted the servicing request. The vacuum cleaner thereby automatically physically connects to the construction tool.

According to one embodiment, the vacuum cleaner is configured to wirelessly connect to the construction tool upon receival of a servicing request from said construction tool and wherein the vacuum cleaner continuously monitors and moves in order to essentially maintain the position and/or orientation of the connected construction tool in relation to the vacuum cleaner. The vacuum cleaner is thereby able to follow the construction tool which is advantageous for instance in floor grinding applications where the construction tool i.e. the floor grinder continuously moves on the floor surface.

According to one embodiment, the vacuum cleaner is configured to monitor the level of dust collected in the dust container of said vacuum cleaner, and upon indication of the container being filled beyond a threshold value, transmit a wireless signal indicating full reservoir. When said signal is received by the construction tool, this results in the construction tool being stopped whereby the vacuum cleaner is configured to stop suction and physically disconnect from the construction tool. Thereby is overfilling of the vacuum cleaner avoided, which enables optimal suction performance of the connected vacuum cleaner.

According to one embodiment, the vacuum cleaner is configured to store a position of a dust container emptying position and upon detection of the dust container of said vacuum cleaner being filled, move the vacuum cleaner to said emptying position. The operator does thereby not have to manually remove the vacuum cleaner and take it to a suitable emptying location which saves valuable time for the operator.

According to one embodiment, the vacuum cleaner is configured to switch on suction during the last segment of the approach to a construction tool in order to facilitate connection between the inlet and the dust ejection arrangement of the construction tool.

According to one embodiment, the vacuum cleaner is configured to use the at least one location and/or orientation sensor to detect and avoid obstacles during movements of said vacuum cleaner. This enables the vacuum cleaner to avoid obstacles and avoid getting stuck on items lying on the floor.

In an embodiment of the teachings herein, the vacuum cleaner detects a position of a construction tool control device and is configured to ensure that it does not linger in any location that is located in the line of sight between the construction tool control device and the construction tool. The vacuum cleaner will therefore not obstruct the view of the construction tool for the operator holding the control device.

In one embodiment, at least one vacuum cleaner and at least one construction tool can be wirelessly paired, thereby allowing wireless communication between paired units. Through the pairing, which may be performed by operator initiation or beforehand by the manufacturer, can wireless communication between the vacuum cleaner and the construction tool be established. This also means that units which are not paired cannot receive or interpret the wireless signals transmitted from the vacuum cleaner and/or the construction tool.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION OF EMBODIMENTS

The disclosed embodiments will now be described more fully hereinafter with reference to the accompanying drawings, in which certain embodiments of the invention are shown. Like numbers refer to like elements throughout.

Figure 1:
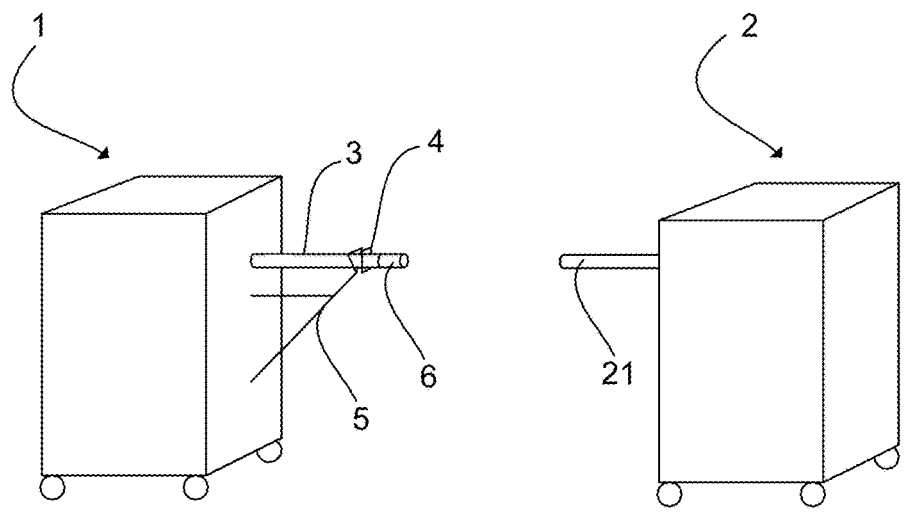
FIG. 1 shows an example outline of an automated vacuum cleaner and a construction tool according to one embodiment.

FIG. 1 shows schematically a robotic work tool 1, in this example an automated vacuum cleaner 1, and a construction tool 2. The vacuum cleaner 1 is preferably an industrial vacuum cleaner, configured for industrial use and for removing saw dust or other types of unwanted materials. The construction tool 2 may be any type of saw or other wood working machine, a floor grinder or any other type of construction tool which requires or allows connection of a vacuum cleaner.

In one embodiment the vacuum cleaner 1 is configured to physically connect to the construction tool 2 via the vacuum inlet 3. The vacuum cleaner 1 may also be configured to track the route that the construction tool 2 has travelled to collect the dust which has been produced by the construction tool 2. This is particularly useful when the construction tool 2 lacks a dust ejection arrangement 21 adapted for connecting to a vacuum cleaner vacuum inlet 3, and instead relies on that the generated dust is vacuumed from the floor surface. In this mode of operation of the vacuum cleaner 1, it is typically fitted with a mouthpiece adapted for vacuuming floor surfaces. The vacuum cleaner 1 does not necessarily have to travel the exactly in the same path and in the same order/direction as the construction tool 2 has travelled. It may be configured to store the construction tool path information and then determine the optimal route both regarding time efficiency and to ensure that the vacuum cleaner 1 does not end up being in the way of the construction tool 2.

In FIG. 1 the vacuum cleaner 1 and the construction tool 2 is shown in a disconnected state, where the construction tool 2 is not in need of being serviced by a vacuum cleaner 1. The vacuum inlet 3 is thus not connected to the construction tool 2. The vacuum cleaner 1 and the construction tool 2 are configured to communicate wirelessly, whereby the construction tool may for instance transmit a servicing request which can be recognized by the vacuum cleaner 1.

The vacuum cleaner 1 may comprises a vacuum inlet 3 being an extendable tube 3, which can be extracted and withdrawn and a stop 4 is arranged to stop withdrawal of the tube 3 to ensure that an end portion 6 of the tube 3 is held in a position suitable for connection to a dust ejection arrangement 21 of the construction tool. The vacuum cleaner 1 may also comprise a tube support 5, configured to support the free end portion 6 of the tube 3 and to make sure that the end portion 3 is held in a correct position for connection the dust ejection arrangement 21. As can also be seen in FIG. 1, the vacuum cleaner 1 comprises wheels to enable movement of the vacuum cleaner, and the wheels may in turn be connected to means for propulsion, i.e. electrical motors for pivoting and/or rotation of said wheels. The construction tool may also comprise wheels. Naturally, the end portion 6 of the vacuum cleaner 1 is configured to be positioned at a vertical height which corresponds to the vertical height of the dust ejection arrangement 21 of a connectable construction tool.

Figure 2:
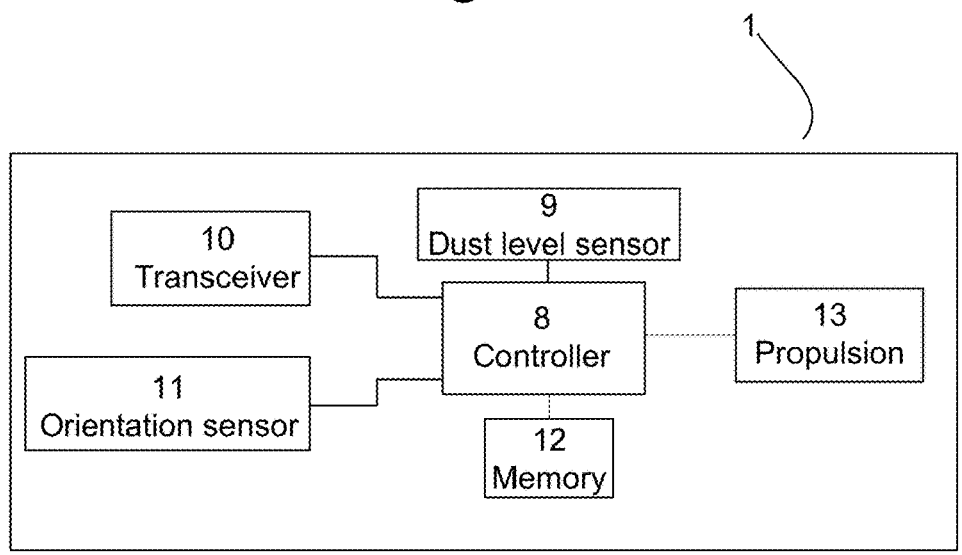
FIG. 2 shows a functional outline of an automated vacuum cleaner according to one embodiment.

With reference to FIG. 2, a functional outline of an embodiment of the vacuum cleaner 1 shown. The vacuum cleaner 1 comprises a controller 8, which may be constituted by any suitable central processing unit CPU, microcontroller, Digital Signal Processor DSP, etc., capable of executing computer program code. The controller 8 may be implemented using instructions that enable hardware functionality, for example, by using executable computer program instructions in a general-purpose or special-purpose processor that may be stored on a computer readable storage medium (disk, memory etc.) 12 to be executed by such a processor. The controller 8 may be implemented using any suitable, publically available processor or Programmable Logic Circuit (PLC). The memory 12 may be implemented using any commonly known technology for computer-readable memories such as ROM, RAM, SRAM, DRAM, FLASH, DDR, SDRAM or some other memory technology. The controller 8 is connected to a wireless communication interface 10 comprising a wireless transceiver 10, configured to transmit and receive wireless signals. A separate transmitter and receiver could also be applied. Examples of such wireless technologies are IEEE 802.11, IEEE 802.15, ZigBee, WirelessHART, WIFI, Bluetooth®, W-CDMA/HSPA, GSM, UTRAN and LTE to name a few. It should be noted that other technologies exist and are taken to be an obvious equivalent for such wireless communication interfaces. The wireless signals are preferably RF signals such as WIFI, Bluetooth, etc. Furthermore, the vacuum cleaner 1 comprises a memory 12 connected to the controller 8, said memory being configured to electronically store information from other components of the vacuum cleaner. For localization and orientation of the vacuum cleaner 1 in relation to other objects, at least one location and/or orientation sensor 11 is provided. The at least one location sensor 11 may include at least one of a camera sensor, a laser sensor, a radar sensor, a GPS-device, a inertial navigation system, a gyroscopic sensor. To detect the relative position of a construction tool wirelessly transferring a servicing request, a multiple antenna receiver may be used in the vacuum cleaner 1, thus enabling calculation of time difference of arrival TDOA of the signals and also enabling calculation of angle of arrival AOA. Signal strength may also be used for calculation of wherefrom a servicing signal originates and distance from the source. The vacuum cleaner 1 further comprises means for propulsion 13 as mentioned above, which are controlled by the controller 8 to move the vacuum cleaner 1 to a destination determined by the controller 8.

In order to monitor that the amount of dust collected in a dust reservoir of the vacuum cleaner 1 does not exceed a threshold value, the vacuum cleaner 1 may comprise a sensor 9 for detection of the dust level. The sensor 9 being connected to the controller 8. Such a sensor 9 may be constituted by a scale, a filter sensor etc.

Figure 3:
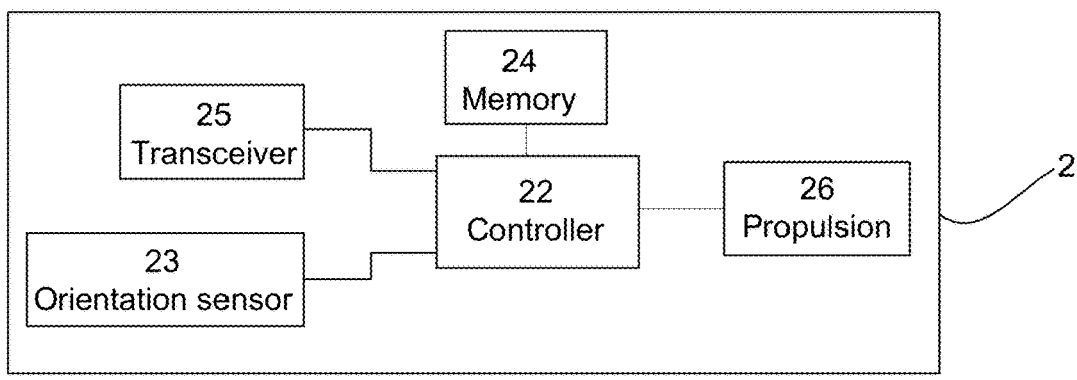
FIG. 3 shows a functional outline of a construction tool according to one embodiment.

Turning to FIG. 3, which shows a functional outline of a construction tool 2 according to one embodiment. The construction tool 2 comprises a controller 22, and connected to said controller 22 a wireless transceiver 25. As mentioned earlier, the transceiver may be constituted by a transmitter and a receiver as separate units. The construction tool 2 further comprises a memory 24 connected to the controller 22 and at least one location and/or orientation sensor 23 also connected to the controller 22. The sensor 23 is configured to at least detect the orientation of the construction tool 2, which will allow the controller 22 to incorporate the information in the transmittal of the servicing request and also transmit orientation information alone. This facilitates the automatic connection of the vacuum cleaner 1 to the construction tool 2. The sensor may be a magnetometer, a solid state compass or other means for detection of the orientation of the construction tool 2.

The construction tool 2 may further comprise means for propulsion 26, i.e. electrical motors controlling the rotation and/or the pivoting of the wheels of the construction tool 2. The means for propulsion 26 is connected to the controller 22 such that it may be controlled thereby. This enables for instance remote control of the construction tool 2, as is sometimes the case for instance for floor grinders.

Figure 4:
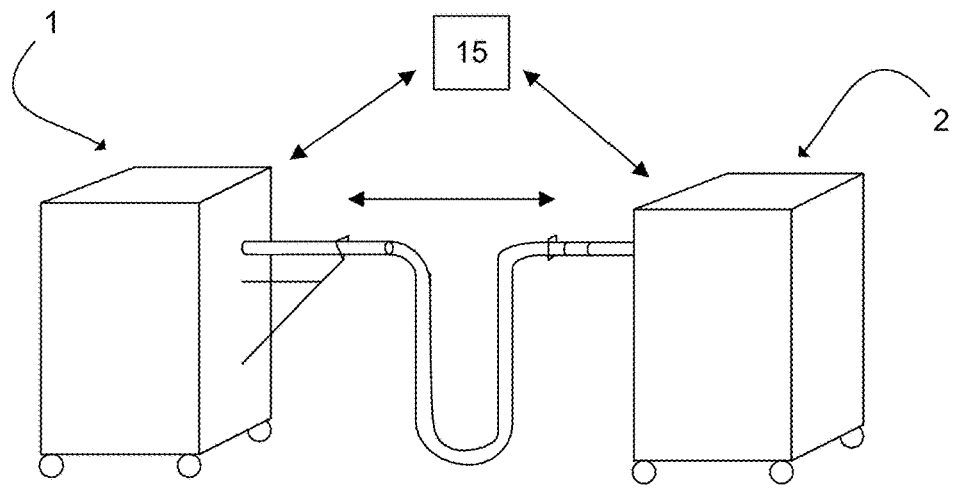
FIG. 4 shows a an example outline of an automated vacuum cleaner and a construction tool according to one embodiment.
Figure 5:
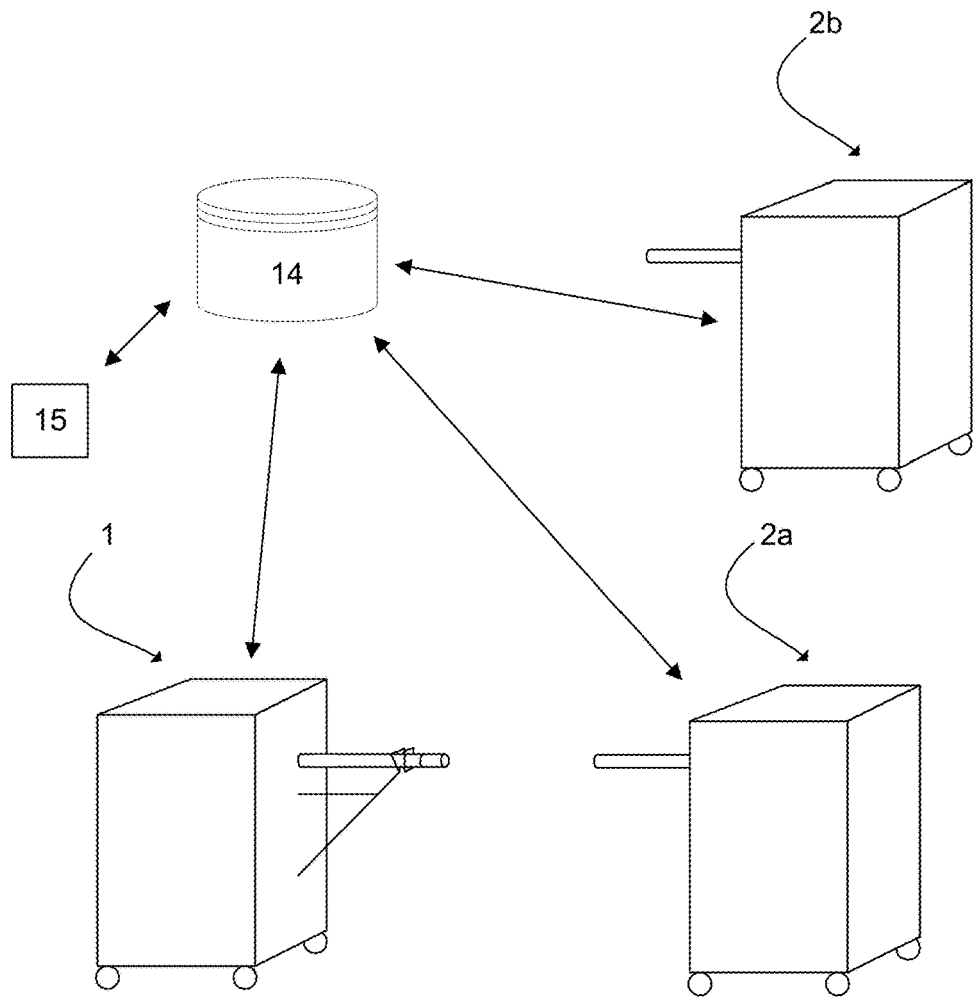
FIG. 5 shows an example outline of a construction system according to one embodiment.
Figure 6:
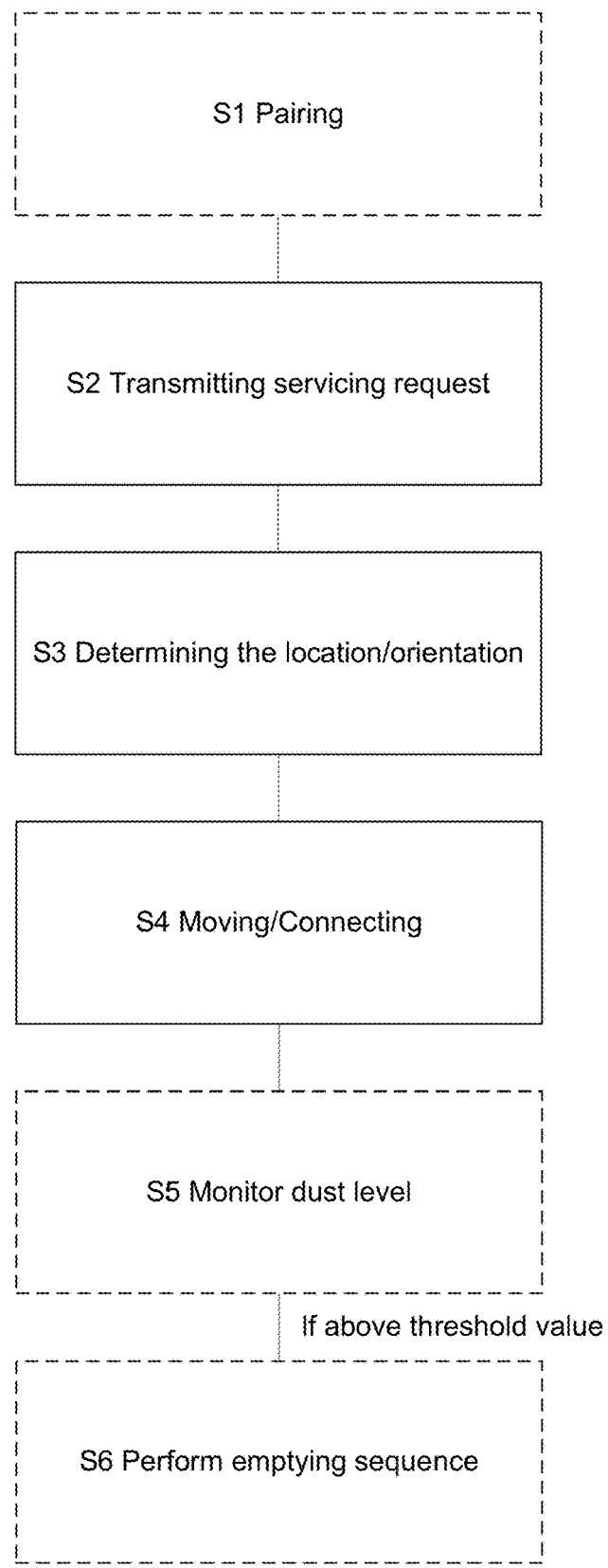
FIG. 6 shows a method for automated servicing of a construction tool according to one embodiment.

FIG. 4 shows a construction system according to an embodiment, the system comprising a vacuum cleaner 1 and a construction tool 2. The vacuum cleaner 1 is configured to communicate wirelessly with at least one construction tool 2 and to localize the position and orientation of said construction tool 2 in relation to the vacuum cleaner 1 position and orientation which allows it to by the means for propulsion move and connect the vacuum inlet 3 to the dust ejection arrangement 21 of the construction tool 2. As it is common that the number of construction tools 2 is higher than the number of vacuum cleaners 1 on a work site, the vacuum cleaner 1 is by the teachings herein enabled to automatically travel between different construction tools 2 which facilitates servicing of a plurality of construction tools 2. The vacuum cleaner 1 may also follow a construction tool 2, in case the construction tool 2 is designed to move during operation. This is achieved through the wireless communication between the vacuum cleaner 1 and the construction tool 2 and through the at least one location and/or orientation sensor 11 of the vacuum cleaner and/or the location and/or orientation sensor 23 of the construction tool 2. As shown in FIG. 5, the construction system may comprise a server 14, such as a database server or a communications server which allows communication between the vacuum cleaner(s) 1 and the construction tool(s) through said server 14 as well as directly communicating with each other. The server 14 may also be connected to the interne, allowing communication to other servers 14 for instance in another part of the building which is not reachable by means of direct RF wireless communication.

FIG. 5 shows a method for automated servicing of a construction tool according to one embodiment. The method is illustrated as a flow chart, however it is to be noted that the various steps may be performed continuously and not necessarily in the order illustrated in FIG. 5.

To establish wireless communication between the units in a construction system according to the teachings herein, the vacuum cleaner(s) 1 and the construction tool(s) may need to be paired which is a common procedure to establish wireless communication between units. This may include transmittal and receiving of an identifier and operator input may be required. Specifically, this may mean that when an operator brings a new vacuum cleaner 1 to a work site, the operator presses a pairing button which allows connection of the vacuum cleaner 1 to the construction tools 2 on the work site and enables them to transmit servicing requests to said vacuum cleaner 1. The pairing may also be performed beforehand by a manufacturer such that all construction tools and vacuum cleaners from a specific manufacturer are paired such that they are able to wirelessly communicate.

The transmittal S2 of a servicing request may be performed automatically if a vacuum cleaner 1 is not already connected to a construction tool 2 when it is switched on. It may also be transmitted by means of an operator activating a servicing request button on a construction tool 2. The servicing request may include information regarding the orientation and/or the location of the construction tool 2. When it is received by the vacuum cleaner 1, the vacuum cleaner 1 determines the location and/or orientation of the construction tool in relation to the location of the vacuum cleaner 1. This is achieved as mentioned earlier through use of the at least one location and/or orientation sensors 11 on the vacuum cleaner 1. When the relative location/orientation of the construction tool 2 is determined, the vacuum cleaner 1 moves S4 by activation of the means for propulsion 13 such that the vacuum cleaner 1 approaches the construction equipment from the correct angle to allow the end portion 6 of the vacuum inlet 3 to connect to the dust ejection arrangement 21 of the construction tool 2. During movement of the vacuum cleaner 1, the at least one location and/or orientation sensor 11 may be configured to detect possible obstacles such as walls or staircases which are thereby possible to avoid through intervention by the controller 8 to steer the vacuum cleaner 1 away from these obstacles. To facilitate the last stage when the end portion 6 of the vacuum inlet 3 is to be connected to the dust ejection arrangement 21, the suction may be switched on by the controller 8 to allow the suction to connect the two and to correct eventual minor movement/orientation errors by the vacuum cleaner 1 and/or the construction tool.

The vacuum cleaner 1 may also be configured to wirelessly connect to the construction tool 2 upon receiving of a servicing request from the construction tool 2. This allows said vacuum cleaner 1 to continuously monitor and move to essentially maintain the position and/or orientation of the connected construction tool 2 in relation to the vacuum cleaner 1. This allows the vacuum cleaner 1 to follow the construction tool 2 as it is moved. The construction tool 2 may be configured to detect by means of the location and/or orientation sensors 23 when the construction tool 2 is moved and to wirelessly communicate this to the connected vacuum cleaner 1 to allow it to move accordingly. Once the vacuum cleaner 1 is physically connected to the construction tool 2, the construction tool 2 may be configured to transmit a wireless signal when a operator uses the tool 2 whereby the vacuum cleaner 1 starts suction and also when the operator stops using the tool 2.

The vacuum cleaner 1 may also be configured to monitor S5 the dust level in a dust container of said vacuum cleaner 1. This allows it to decide when a certain dust level threshold value is reached upon which the vacuum cleaner 1 may transmit a wireless signal indicating full reservoir which, when received by the construction tool 2, results in that the construction tool 2 stops, whereby the vacuum cleaner 1 may be configured to stop suction and physically disconnect from the construction tool 2. The vacuum cleaner 1 may also be configured to store a position of a dust container emptying position and upon detection of the dust container of said vacuum cleaner 1 being filled, move the vacuum cleaner 1 to said emptying position. This may be achieved by for instance storing a GPS location or by means of RF localization by the vacuum cleaner 1.

It should be mentioned that the inventive concept is by no means limited to the embodiments described herein, and several modifications are feasible without departing from the scope of the invention as defined in the appended claims. For instance, the automated servicing may be applied for instance for grass collectors which are configured to automatically follow and collect grass which is cut by a lawn mower as will be described briefly below.

In one embodiment a first power tool is configured for servicing at least a second power tool, said first power tool comprising an extendable tube, said first power tool further comprises a stop which restricts withdrawal of said tube, said tube comprises an end portion configured for connection to an ejection arrangement on the second power tool, wherein said first power tool further comprises a controller and connected to said controller a wireless transceiver, a memory, and at least one location and/or orientation sensor configured for detection of first power tool location and/or localization of other objects and wherein the first power tool further comprises means for propulsion controlled by said controller. In one embodiment a power tool system is provided comprising a first power tool and a second power tool. The first power tool is configured to communicate wirelessly with at least one second power tool and to localize the position and orientation of said second power tool in relation to the first power tool position and orientation.

In one embodiment the first power tool is a grass collector or a vacuum cleaner arranged to collect grass and the second power tool is a robotic lawn mower arranged to cut grass. The ejection arrangement is a grass ejection arrangement.

In one embodiment the first power tool is an ice collector or a vacuum cleaner arranged to collect ice and the second power tool is a ice resurface arranged to clean and smooth the surface of an ice sheet.

In one embodiment the first power tool is a golf ball collector or a vacuum cleaner arranged to collect golf balls and the second power tool is a robotic lawn mower arranged to cut grass. The ejection arrangement is a golf ball ejection arrangement.

As has been disclosed in the above, the teachings of this application thus provide for an automated vacuum cleaner that is configured to service a construction tool by relocating its own position in order to align with the construction tool so that it vacuums the dust products generated by the construction tool. In the embodiment where the construction tool is a floor grinder (or sander) the vacuum cleaner services the floor grinder by vacuuming the floor area treated by the floor grinder.

The vacuum cleaner may relocate relative the construction tool by adapting its propulsion and following the construction tool as the construction tool moves, so that the vacuum cleaner targets the construction tool and follows behind, immediately or at distance, the construction tool in order to service the area as the area is treated and without risking that any dust or other debris is spread—for example by passer bys—before it can be cleaned.

The vacuum cleaner may alternatively or additionally be configured to follow the construction tool as the construction tool moves by recording a path taken by the construction tool through receiving position information of the construction tool and to cover the same path as the construction tool. The floor grinder transmits its position continuously or at regular intervals to the vacuum cleaner, who tracks the progress of the floor grinder and records the path taken. As the vacuum cleaner is then set to service the floor grinder it relocates itself by following the same path taken by the floor grinder. This ensures that the same path is treated by both machines, even if the vacuum cleaner is not set to operate at the same time as the floor grinder, which allows one vacuum cleaner to service more than one floor grinder.

In order to enable a vacuum cleaner to service the same area as the floor grinder, but necessarily to in the same order—to allow for other work to be done in some areas or by following a more optimal path from the vacuum cleaner's current position, the vacuum cleaner may be configured to follow the construction tool as the construction tool moves by recording an area covered by the construction tool through receiving position information of the construction tool and to cover the same area as the construction tool. As when recording a path, the vacuum cleaner may record an area and then determine its own propulsion to cover the same area—although not necessarily along the same path.

To enable a more close servicing, the inlet of the vacuum cleaner may comprise an end portion 6 configured for connection to a dust ejection arrangement 21 on the construction tool 2, and wherein the vacuum cleaner 1 is configured to relocate by attaching the end portion 6 of the inlet 3 to the dust ejection arrangement 21 on the construction tool 2. This allows the vacuum cleaner to physically connect to the construction tool so that is may vacuum directly at the operating area or active area of the floor grinder. This ensures a highly effective vacuuming.

To prevent that the vacuum cleaner is prematurely separated from the floor grinder, the vacuum inlet 3 is an extendable tube 3, and the vacuum cleaner 1 further comprises a tube support 5 and a stop 4 which restricts withdrawal of said tube 3.

In one embodiment the navigation sensor is a location sensor configured for detection of a vacuum cleaner location for enabling the vacuum cleaner to navigate according to its present location. This allows the vacuum cleaner to follow a recorded path or travel to a determined position, such as the location of the construction tool.

In one embodiment the navigation sensor is an orientation sensor 11 configured for detection of localization of other objects in relation to the vacuum cleaner 1 for enabling the vacuum cleaner to navigate according to surrounding objects. This enables the vacuum cleaner to adapt its travel based on detecting objects that may not have been present when the construction tool was operating and also allows the vacuum cleaner to navigate without getting stuck or otherwise obstructed by furniture, structures or other objects.

As has been mentioned, the vacuum cleaner may also comprise a sensor 9 for detecting level of dust in a dust container of said vacuum cleaner 1. The vacuum cleaner 1 is configured to detect when a dust level exceeds a threshold level and in response thereto move a dust dumping station. This allows the vacuum cleaner to follow and service a floor grinder for as long as it ha the capacity to collect dust. As the vacuum cleaner is full, it may undock or otherwise interrupt the following of the floor grinder, travel to a dumping station, empty or replace its dust container and then return to continue servicing the floor grinder, by chasing down the floor grinder, by following the same path or covering the same area as that covered by the floor grinder.

The floor grinder, or other construction tool that is configured for being serviced by an automated vacuum cleaner 1 is thus configured to transmit its location to the automated vacuum cleaner 1 to enable relocation of the automated vacuum cleaner 1.

As has been touched upon in the above a vacuum cleaner may thus be wirelessly paired to one or more construction tools. This allows one vacuum to service more than one construction tool, especially useful when the vacuum cleaner is arranged to cover a same path or area as the construction tool. The vacuum cleaner can then be set to operate after the construction tool ahs been used, for example at night, and then cover more than one construction tool.

Likewise, one construction tool may be paired with more than one vacuum cleaner, the vacuum cleaners then being enabled to take turns in servicing one and the same construction tool, or doing so at the same time for high capacity construction tools. This also enables the vacuum cleaners to operate in a manner that is optimized based on the closest construction tool or covered area based on the vacuum cleaner's' positions.

The invention claimed is:

1. A construction system comprising:
    an automated vacuum cleaner; and
    a construction tool that produces dust or debris due to operation of the construction tool, the construction tool being a mobile construction tool comprising a means for propulsion of the mobile construction tool;
    wherein the automated vacuum cleaner is configured to receive a wireless communication of a service request from the construction tool; and
    wherein the construction tool comprises:
        a controller,
        a wireless transmitter connected to the controller, and
        a location sensor or an orientation sensor;

wherein the controller is configured to control the wireless transmitter to transmit a location of the construction tool to the automated vacuum cleaner to enable relocation of the automated vacuum cleaner based on the location of the automated vacuum cleaner, wherein the automated vacuum cleaner is further configure to:
  wirelessly connect the automated vacuum cleaner to the construction tool upon reception of the servicing request from the construction tool; and
  continuously monitor the construction tool via a wireless connection and responsively move to maintain a following position with the construction tool by changing location or orientation to collect the dust or debris generated by the construction tool.

2. The construction system of claim 1, wherein the system further comprises a server configured to wirelessly communicate with the automated vacuum cleaner and the construction tool.

3. The construction system of claim 1, wherein the system further comprises a construction tool control device configured to wirelessly connect to the construction tool and remotely control the construction tool by an operator; and
  wherein the automated vacuum cleaner is configured to ensure that the automated vacuum cleaner does not remain, for more than a threshold duration of time, in any location that is located in a line of sight between the construction tool control device and the construction tool.

4. The construction system of claim 1 wherein the automated vacuum cleaner is configured to approach the construction tool in response to the receipt of the service request and move into the following position.

5. The construction system of claim 1 wherein the automated vacuum cleaner is further configured to:
  monitor a level of dust collected in a dust container of the automated vacuum cleaner;
  in response to an indication of the dust container being filled beyond a threshold value, transmit a full dust container wireless signal to the construction tool to cause the construction tool to stop movement; and
  subsequent to the construction tool stopping movement, stop suction.

6. The construction system of claim 5, wherein the automated vacuum cleaner is further configured to:
  store a position of a dust container emptying position; and
  move to the dust container emptying position.

7. A method for operating a system for automated servicing of a construction tool by an automated vacuum cleaner, the construction tool being configured to produce dust and debris due to operation of the construction tool, the construction tool being a mobile construction tool comprising a means for propulsion of the mobile construction tool, the system comprising the construction tool and the automated vacuum cleaner, the method comprising:
  transmitting a wireless signal comprising a servicing request by the construction tool;
  receiving the wireless signal comprising the servicing request by the automated vacuum cleaner;
  determining, by a vacuum cleaner controller of the automated vacuum cleaner:
    a relative location based on a location of the construction tool in relation to a location of the vacuum cleaner by analyzing the servicing request, or
    a relative orientation based on an orientation of the construction tool in relation to an orientation of the automated vacuum cleaner by analyzing the servicing request; and
  relocating, by the vacuum cleaner controller, the automated vacuum cleaner based on the relative location or the relative orientation;
  wirelessly connecting the automated vacuum cleaner to the construction tool upon reception of the servicing request from the construction tool, and
  continuously monitoring and responsively moving by the automated vacuum cleaner to maintain a following position with the construction tool by changing location or orientation to collect the dust or debris generated by the construction tool.

8. The method of claim 7 further comprising approaching, by the automated vacuum cleaner, the construction tool in response to receipt of the service request and moving into the following position.

9. The method of claim 7 further comprising:
  monitoring, by the automated vacuum cleaner, a level of dust collected in a dust container of the automated vacuum cleaner;
  in response to an indication of the dust container being filled beyond a threshold value, transmitting, by the automated vacuum cleaner, a full dust container wireless signal to the construction tool; and
  in response to receiving the full dust container wireless signal by the construction tool, stopping movement of the construction tool; and
  subsequent to stopping movement of the construction tool, stopping suction by the automated vacuum cleaner.

10. The method of claim 9 further comprising:
  storing a position of a dust container emptying position; and
  moving the automated vacuum cleaner to the dust container emptying position.

11. The method of claim 7 further comprising using a location sensor or an orientation sensor to detect and avoid obstacles during movement of the automated vacuum cleaner.

12. The method of claim 7 further comprising detecting a position of a construction tool control device and ensuring that the vacuum cleaner does not remain, for more than a threshold duration of time, in any location that is in a line of sight between the construction tool control device and the construction tool.

13. A construction tool configured to be serviced by an automated vacuum cleaner, the construction tool comprising:
  a controller;
  a wireless transmitter connected to the controller; and
  a location sensor or an orientation sensor;
  wherein the controller is configured to control the wireless transmitter to transmit a location of the construction tool to the automated vacuum cleaner to enable relocation of the automated vacuum cleaner based on the location of the automated vacuum cleaner;
  wherein the construction tool is a mobile construction tool and further comprises means for propulsion controlled by the controller.

* * * * *